United States Patent
Sugi et al.

[11] Patent Number: 5,812,821
[45] Date of Patent: Sep. 22, 1998

[54] SMALL COMPUTER SYSTEM INTERFACE ("SCSI") CONTROLLER

[75] Inventors: Haruo Sugi, Machida; Susumu Shimotono, Hadano; Hideyuki Tagai, Yamato; Mayumi Takahashi, Zama; Naoki Harada, Yokohama, all of Japan

[73] Assignee: International Business Machines Corporation, Armonk, N.Y.

[21] Appl. No.: 537,042

[22] Filed: Sep. 28, 1995

[30] Foreign Application Priority Data

Sep. 28, 1994 [JP] Japan ................................ 6-233163

[51] Int. Cl.⁶ ............................. G06F 3/00; G06F 13/00
[52] U.S. Cl. ......................... 395/500; 395/828; 395/829
[58] Field of Search .................... 395/500, 280, 395/828, 829, 830, 835, 182.04, 183.01, 183.2, 833; 711/100

[56] References Cited

U.S. PATENT DOCUMENTS

| | | | |
|---|---|---|---|
| 4,360,870 | 11/1982 | McVey .................................. | 395/829 |
| 4,730,251 | 3/1988 | Aakre et al. ........................... | 395/284 |
| 4,899,274 | 2/1990 | Hansen et al. ...................... | 395/200.1 |
| 5,014,193 | 5/1991 | Garner et al. ......................... | 395/830 |
| 5,313,595 | 5/1994 | Lewis et al. .......................... | 395/306 |
| 5,367,647 | 11/1994 | Coulson et al. ...................... | 395/285 |
| 5,428,748 | 6/1995 | Davidson et al. .................... | 395/829 |
| 5,434,516 | 7/1995 | Kosco ................................... | 326/30 |
| 5,454,083 | 9/1995 | Choi ..................................... | 395/285 |
| 5,467,453 | 11/1995 | Kogis .................................... | 395/281 |
| 5,535,413 | 7/1996 | Kondou et al. ....................... | 395/825 |
| 5,544,333 | 8/1996 | Frazier et al. ......................... | 395/304 |
| 5,572,659 | 11/1996 | Iwasa et al. ........................ | 395/182.04 |
| 5,579,529 | 11/1996 | Terrell et al. ......................... | 395/828 |
| 5,581,787 | 12/1996 | Saeki et al. ........................... | 395/829 |
| 5,655,148 | 8/1997 | Richman et al. ...................... | 395/828 |
| 5,666,557 | 9/1997 | Cassidy et al. ....................... | 395/828 |

*Primary Examiner*—Kevin J. Teska
*Assistant Examiner*—Herbert McNair
*Attorney, Agent, or Firm*—Martin J. McKinley

[57] ABSTRACT

Disclosed is a data processing apparatus that has two or more internal SCSI devices, to include a SCSI controller, that can also accommodate eternal SCSI devices via a port connector and that can manage the ID numbers (identification numbers) of the internal SCSI devices separately from all the other SCSI devices without requiring any action by a user; and a method for controlling such a data processing apparatus. According to the present invention, ID numbers can be written into internal SCSI devices. ID numbers that do not collide with the ID numbers of the externally connected SCSI devices are assigned to the respective internal SCSI devices. The system can automatically write the ID numbers during the booting process or when the system configuration is physically changed. Even when there are SCSI hard disk drives installed both inside and outside the system, the ID numbers of the SCSI hard disk drives that are internally positioned can be read so that the internal SCSI hard disk drives can be designated. When a system enters into a hibernation mode because the remaining capacity of a battery falls low, an internal SCSI hard disk can be designated as a hibernation target to which a hibernation file is saved.

2 Claims, 11 Drawing Sheets

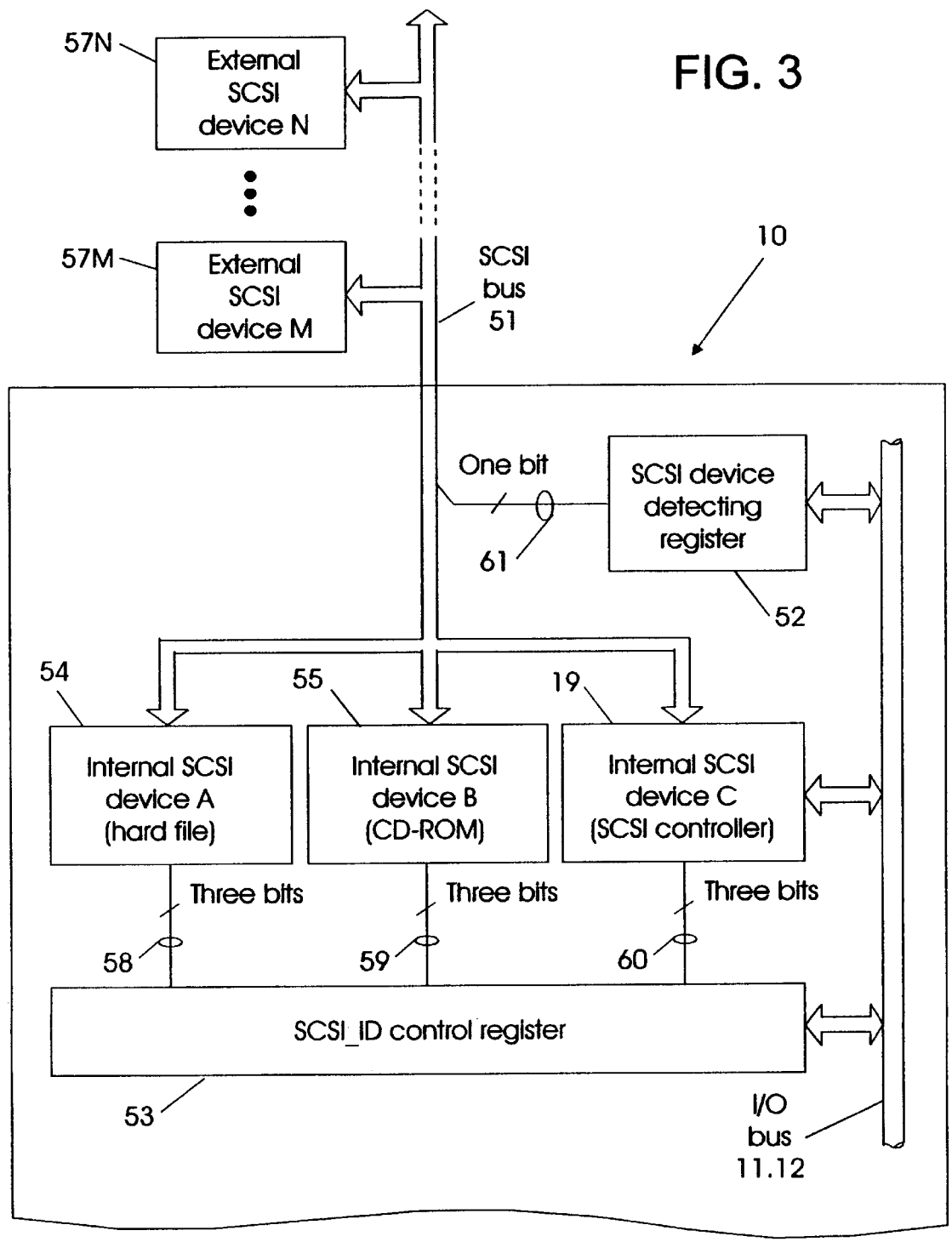

| Parameter | Internal SCSI Hard File | Internal SCSI CD-ROM | Internal SCSI Controller | External SCSI Device M | External SCSI Device N |
|---|---|---|---|---|---|
| SCSI ID | 2 | 3 | 7 | 0 | 6 |
| Logical Number | 12h | 14h | NA | 13h | 10h |
| Drive Letter | D: | F: | NA | E: | C: |
| Hibernation target available or not | Available (A) | Not Available (NA) | Not Available (NA) | Not Available (NA) | Not Available (NA) |

I/F .... Interface

SMALL COMPUTER SYSTEM INTERFACE ("SCSI") CONTROLLER

BACKGROUND OF THE INVENTION

Applicants claim the foreign priority benefits under 35 U.S.C. 119 of Japanese Application No. 6-233163 filed Sep. 28, 1994. This Japanese Application and its translation are incorporated by reference into this Application.

The present invention relates to a data processing apparatus, such as a personal computer, that includes a SCSI bus port connector, and to a method for controlling such a data processing apparatus. In particular, the present invention pertains to a data processing apparatus, such as a personal computer, that can have two or more SCSI devices including a SCSI controller, mounted internally, and that can accommodate the optional external installation of SCSI devices via a port connector, and to a method for controlling such a data processing apparatus. In more detail, the present invention relates to a data processing apparatus that can manage ID numbers (identification information) of the respective SCSI devices that are provided internally, within the apparatus (not by user operation), and to a method for controlling such a data processing apparatus.

Personal Computer (e.g., Desktop) SCSI Support

At present, various types of personal computers, such as the desktop, are in wide use. Such computers are normally designed to incorporate hard disk drives (HDD's) and a few input/output devices, such as printers (or I/O devices, hereafter referred to simply as "devices"), and to be capable of external connectivity via a port connector. One of the common interfaces that are employed to connect input/output devices to a computer system is the SCSI (Small Computer System Interface), for which standards have been established by the ANSI (American National Standards Institute). Since currently there are such various SCSI file type devices as HDDs, CD-ROMs, and MOs (magneto-optic discs), the SCSI is considered the standard in this field. A device that has an interface conforming to the SCSI is called a "SCSI device," and a bus that can be connected to a SCSI interface is called a "SCSI bus."

Originally, the SCSI was developed for desktop computers. Recently, highly integrated and compact LSI's for SCSI control have been made, and accordingly, SCSI interfaces tend to be employed for compact portable computers. An example portable computer can incorporate several SCSI devices, including a SCSI controller, and can also accommodate externally installable SCSI devices via a port connector (for example, a notebook type personal computer that has a SCSI interface is described in Japanese Unexamined Patent Publication No. Hei 5-67047).

The SCSI standards permit the connection of up to eight SCSI devices. FIG. 10 shows the state where five SCSI devices are connected to a computer. A daisy chain connection is formed by coupling the SCSI devices together, in order, with the first device connected to the SCSI bus. Further, as is shown in FIG. 10, some of the SCSI devices connected together in the daisy chain may be internally installed within the system, while other, optional SCSI devices can be externally connected. One of the SCSI devices in the daisy chain is SCSI controller. The SCSI controller serves as an "initiator" that issues SCSI commands toward the SCSI bus, and is provided at one end of the chain (normally inside the system). The SCSI controller communicates with a CPU within a computer body (hereafter referred to as a "system" or a "host") via an I/O bus inside the host. The SCSI controller sends commands and messages to other SCSI devices on the SCSI bus. Those SCSI devices sends data and messages back to the SCSI controller.

In installing SCSI devices into the system, it is, at least, necessary to identify the ID numbers and the device types of the individual SCSI devices in order to understand the system configuration. ID number, for which numbers of from 0 to 7 are used, is to be assigned to each SCSI device for identification; it can be set by a user by the mechanical manipulation of jumper switches. An ID number represents also a priority order in arbitration. The priority level inversely corresponds to the descending order of the ID numbers ("7" has the highest priority and "0" has the lowest). The device type for file type SCSI device is a parameter that indicates a recording medium, such as hard disk, CD-ROM, or MO. The individual devices can transmit their ID numbers and device types in accordance with protocols that are specified by the SCSI. In other words, the system can acquire the ID numbers and the device types of the SCSI devices by exchanging SCSI commands and data.

When the system receives the ID numbers and device types of the SCSI devices that are installed, logical numbers (normally represented by the hexadecimal system) and drive letters are assigned to the file type SCSI devices (hereafter also referred to as an "SCSI file") (the assignment is actually preformed by the file manager of the host's operating system (OS)). So-called "system software," such as the OS and the device driver of the system, can identify individual SCSI files with reference to the logical numbers. Further, an application program that is executed on the OS can identify an individual SCSI file by employing a drive letter (for example, the SCSI file to which drive A is assigned is displayed as a prompt "A:" on the display screen).

It should be noted that the system does not know whether SCSI devices are installed internally (inside the PC body) or connected to the system externally. For example, ID numbers are employed to identify individual SCSI devices, but they do not represent the physical locations for the corresponding SCSI devices. The priority order for the SCSI devices, which is represented by the ID numbers, naturally is unrelated to the locations of the SCSI devices, whether they are located internally or externally. Regardless of the physical locations of SCSI devices the system software treats it in a same way. When, for example, two or more SCSI hard disk drives are simultaneously installed inside and outside of the system, the system logically assumes that they are in the same location and does not distinguish the internally installed SCSI devices among them. Further, the SCSI standards do not include rules for determining whether individual SCSI devices are being installed into the system either internally or externally (this is well known to one having ordinary skill in this technical field). The system, therefore, can only identify the SCSI files by referring to their ID numbers and device types, and cannot determine where they are physically located.

Portable Computer SCSI Support

As the technique has been advanced, portable computers (or more specifically notebook computers) that in the interests of portability are designated to be light and compact have been produced and are in wide spread use. Since one of the requirements for portable computers is that they be portable and capable of being used outdoors, portable computers are so designed that they can be operated by built-in battery packs in addition to commercially available power sources. As a battery pack is compactly made and its life expectancy is short, various power management schemes for extending the battery life are developed.

"Hibernation" is one example of those power management schemes. Hibernation is an operation by which, when a condition arises that makes it impossible to continue a job (such as a voltage drop at the battery pack), all the data that are required to resume the job later at the point of interruption are saved to the hard disk (HDD) of the system and then the whole system is powered off. The data to be saved to the HDD's, for example, hardware context information, such as the contents of a main memory and a VRAM, the I/O setting status, and the status of a CPU. Hereafter, the data is referred to as a "hibernation file". When a user powers on the system after the power supply has been reinstated, the hibernation file that has been stored on the hard disk is restored to the original sections and then the job that was halted is automatically restarted at the point of interruption. This job restart operation is called a "wake up." A series of power management operation, the "hibernation" and the "wake up," are executed by a PMC (Power Management Code) that is included in the OS of the system or in the ROM of the system.

As described above, SCSI hard disks can be installed both inside and outside the system of a portable computer that supports the SCSI interface. When the portable computer enters into the hibernation mode, the hibernation file is saved to a file type device (normally, a hard disk) designated by the PMC. Since the built-in devices tend to be used by being fixed inside the system and the externally connected devices tend to be exchanged with other SCSI devices, the hibernation file is preferably saved in the built-in SCSI file device for the data security. However, since the system cannot determine which of the installed SCSI file devices are connected inside or outside the system, the internally installed SCSI hard disk cannot always be designated for saving hibernation file (hereafter, the designated file device is referred to as a "hibernation target"). If the externally connected SCSI hard disk is designated as a hibernation target and is disconnected from the system after entering into the hibernation mode, even when the power supply is restore and the system is powered on again, the system cannot wake up and restart the job at the point of interruption because the hibernation file cannot be retrieved.

To avoid such an inconvenience, there is a method whereby a user voluntarily inputs the ID numbers of internal SCSI devices into the system during the boot process. However, when a system has been in use for a long time, the external SCSI devices will have been repeatedly disconnected and exchanged with others (since the replacement of externally installed devices is optional). In addition, it may have been necessary for the ID numbers of the internally connected SCSI devices to have been altered so as not to collide with the ID numbers of newly connected SCSI devices. Further, a plurality of users may share the same system. In this case, each of the users may disconnect and replace the SCSI devices as they desire, and may alter the ID numbers without the acknowledgment of the other users. That is, the ID numbers of the respective SCSI devices are not necessarily constantly kept. Aside from that, it is very troublesome for users to be required to input a newly assigned ID number of the internal SCSI device each time they boot up. Also, if a user should forget to input a new ID number into the system, it may cause the system to operate imperfectly. Therefore, when the system configuration is changed at boot up or when the SCSI devices are disconnected and replaced, it is preferable for the system to automatically detect and update the ID numbers of the internal SCSI devices without requiring any input from the user.

SUMMARY OF THE INVENTION

It is an object of the present invention to provide a data processing apparatus that has internally mounted SCSI devices including a SCSI controller, that can accommodate external SCSI devices via a port connector, and that can manage the ID numbers (identification numbers) of the internal SCSI devices among all the installed SCSI devices without requiring input from a user; and a method for controlling such a data processing apparatus.

It is another object of the present invention to provide a data processing apparatus that has internally mounted SCSI devices including a SCSI controller, that can accommodate external SCSI devices via a port connector, and that can select, from among all the connected SCSI devices, an internal SCSI device to designate as a storage destination for predetermined information; and a method for controlling such a data processing apparatus.

It is a further object of the present invention to provide a portable computer that has two or more internally mounted SCSI devices including a SCSI controller, that can accommodate external SCSI devices via a port connector, and that, when the system enters into a hibernation mode, can distinguish, from among all the connected SCSI devices, an internal hard disk for saving a hibernation file; and a method for controlling such a portable computer.

To achieve the above described objects, according to the first aspect of the present invention, a data processing apparatus having two or more internal SCSI devices including a SCSI controller, and that can install at least one SCSI device externally, comprising: means for determining whether any external SCSI devices are connected; and an ID control means for reading or writing ID numbers for the SCSI devices.

According to the second aspect of the present invention, a data processing apparatus having two or more internal SCSI devices that include a SCSI controller, and being capable of installing at least one SCSI device externally via a port connector, comprising: an external device detection means for determining whether or not a SCSI device is externally connected; and an ID control means for reading or writing ID numbers for the SCSI devices.

According to the third aspect of the present invention, a data processing apparatus having two or more internal SCSI devices including a SCSI controller, and being capable of installing at least one SCSI device externally via a port connector, comprising: an external device detection means for determining whether or not a SCSI device is externally connected; a means for searching for an ID number that is not assigned to the SCSI device that is externally connected; and an ID control means for writing, to the internal SCSI devices, ID numbers that are determined to be unused by the ID search means, and for reading the ID numbers from the SCSI devices.

According to the fourth aspect of the present invention, a data processing apparatus having at least a SCSI controller and a SCSI hard disk drive that are internally installed, and being capable of installing one or more SCSI devices externally via a port connector, comprising: means for reading and writing an ID number for the SCSI hard disk drive.

According to the present invention, therefore, ID numbers can be written into the internally installed SCSI devices. The ID numbers that do not collide with the ID numbers of the externally connected SCSI devices are assigned to the internal SCSI devices. Further, the system can automatically write the ID numbers during the boot process, or when the system configuration is physically changed.

In addition, according to the present invention, the system can read the ID numbers of the internal SCSI devices. Thus, even when SCSI hard disk drives are installed both inside and outside of the system, the ID numbers of the internal SCSI hard disk drives can be read by the system to identify them as the internal SCSI hard disk drives. Then, when the system enters into a hibernation mode because the power of the battery falls low, an internal SCSI hard disk can be designated as a hibernation target exactly.

According to the present invention, the ID numbers of SCSI devices can be read or written via a dedicated interface other than the SCSI interface, and the system, or the SCSI devices, does not have to be set to a specific operational mode when the ID numbers are read or written. Since the reading and writing of ID numbers can be performed at any time, the system configurations can be altered physically at times other than during the boot process.

The other objects, features, and advantages of the present invention will be obvious from the detailed explanation of the embodiments of the present invention, which will be presented later while referring to the accompanying drawings.

BRIEF DESCRIPTION OF THE DRAWINGS

FIG. 1 is a diagram illustrating the outline of a portable computer according to the present invention, or more specifically.

FIG. 3 is a diagram showing the hardware arrangement of a system according to the embodiment of the present invention, and more specifically, the hardware arrangement for the connection of the SCSI devices.

DESCRIPTION OF THE ILLUSTRATIVE EMBODIMENTS

Portable Computer Outline

FIG. 1 is an outline illustration of a portable computer 10 according to one embodiment of the present invention. A computer 10 comprises a cover 1 that has a liquid crystal display (LCD) mounted on its internal surface and a body 2 that has a keyboard 3 arranged atop it.

Figure 1A:
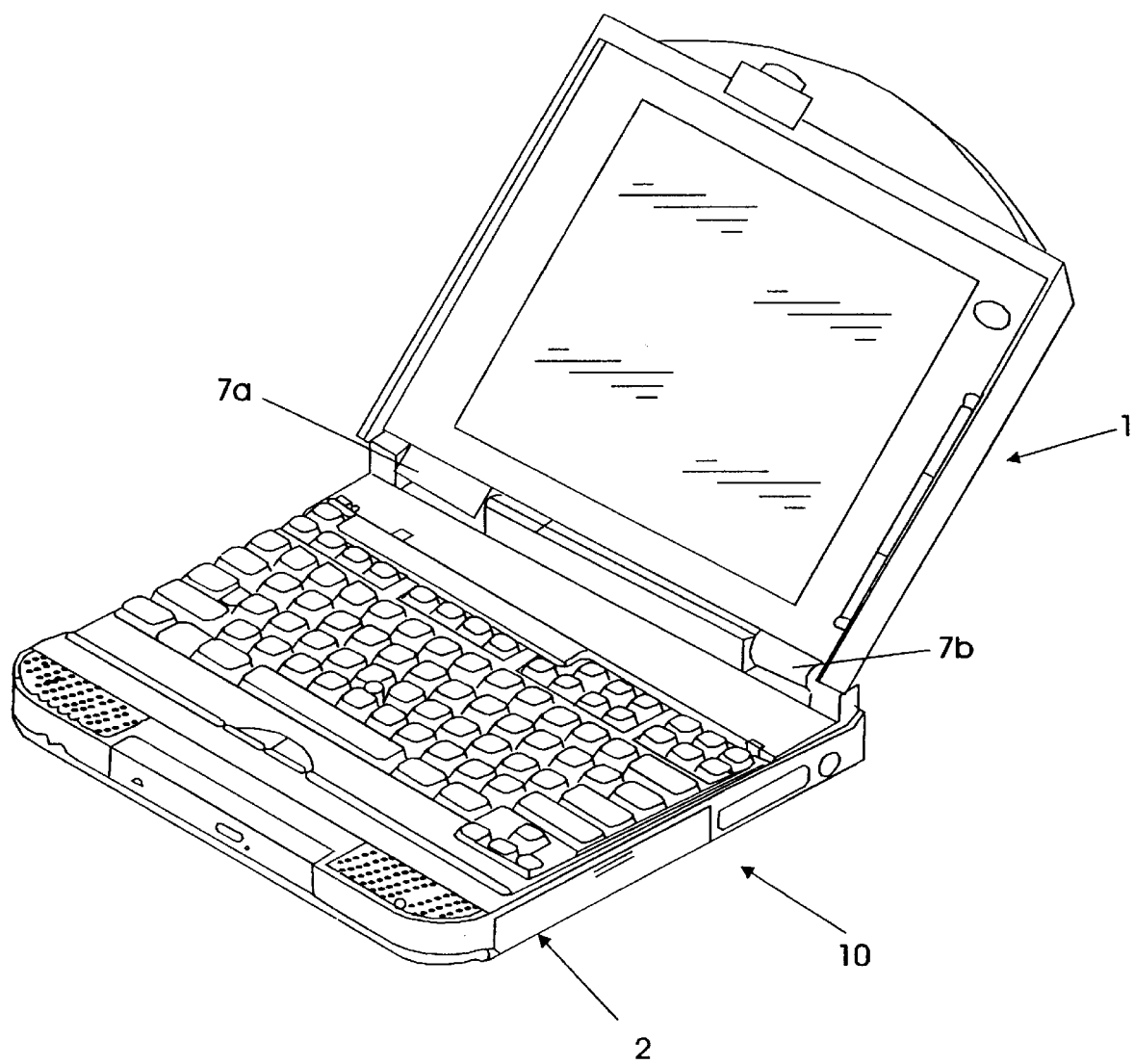
FIG. 1A is a diagram showing a portable computer when a liquid crystal display device (LCD) that acts as a cover is open.

In FIG. 1A, the cover 1 is open and the LCD and the keyboard 3 can be used. A pair of cylindrical protrusions 7a and 7b are integrally formed on the cover 1 along its rear edge. The protrusions 7a and 7b are supported rotatable relative to the body 2, and the cover 1 is hinged on the body 2.

Figure 1B:
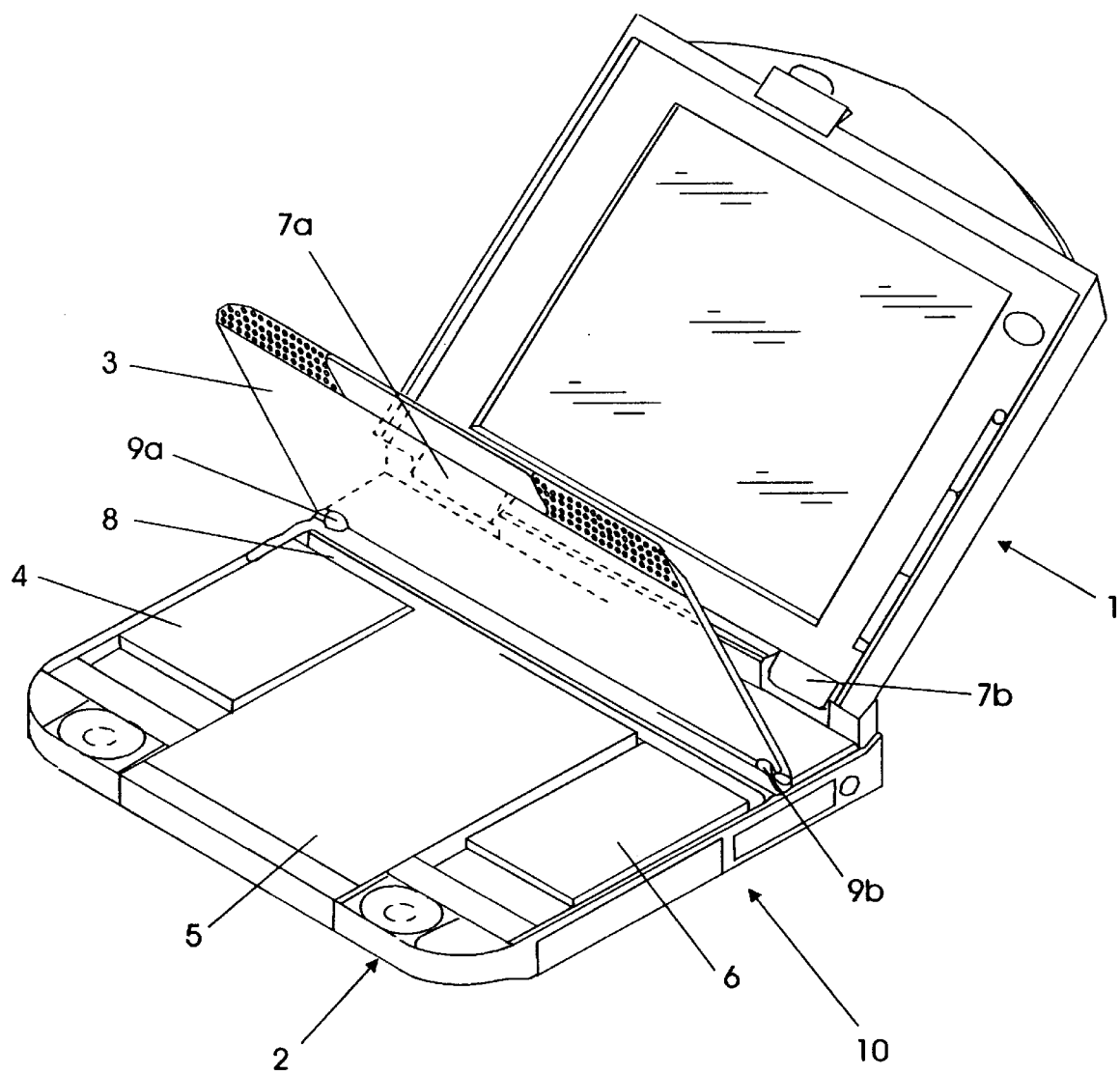
FIG. 1B is a diagram showing the inside of the body of a portable computer when a keyboard that acts as a cover of the body is open.

In the illustration in FIG. 1B the keyboard 3 is open and the interior of the body 2 is exposed. A pair of tongue-shaped protrusions 9a and 9b are integrally formed on the keyboard 3 along its rear edge. The protrusions 9a and 9b are supported rotatable relative to the body 2, and the keyboard 3 is hinged on the body 2. A partition wall 8 is provided at almost the center of the body 2 to separate the front portion from the rear portion. In the rear portion of the body 2, which is shielded by the partition wall 8, are stored the internal circuits of a personal computer, such as a CPU, a RAM, a ROM, and a system bus (not shown). The bay in front of the partition wall 8 is defined, in which an HDD 4, a CD-ROM 5, and a battery pack 6 are provided. An I/O port and a battery terminal (not shown) are provided on the front face of the partition wall 8 for the electrical connection of the devices and the battery pack. The HDD 4, the CD-ROM 5, and the battery pack 6 can be removed and replaced by new ones by opening the keyboard 3.

It should be noted here that the internal circuits of the portable computer 10 in this embodiment include a SCSI controller, which is one of the internally provided SCSI devices (see FIG. 2), and that SCSI devices can be installed as standard devices. More specifically, the I/O port that is provided on the front face of the partition wall 8 is a port connector for a SCSI bus (for an internal SCSI device) and connects the HDD 4 and the CD-ROM 5 as internal SCSI devices. Another I/O port for a SCSI bus is provided on the rear side of the computer body 2, and is so designed that a maximum five external SCSI devices can be connected to the SCSI bus in the form of a daisy chain (not shown).

Hardware Arrangement of the System

Figures 2, 2B:
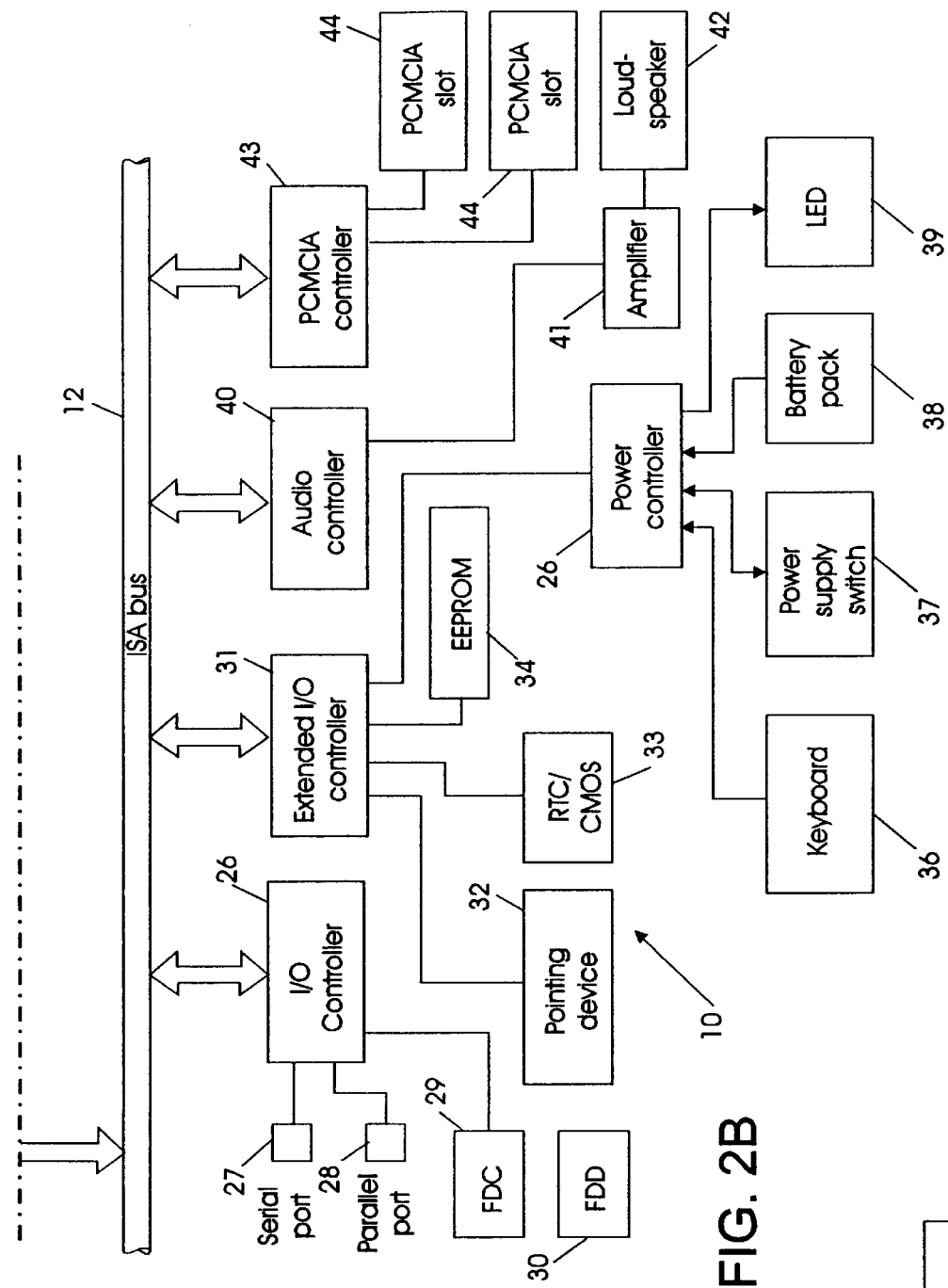
FIG. 2 is a schematic diagram illustrating the hardware arrangement of a portable computer according to one embodiment of the present invention.
Figure 2A:
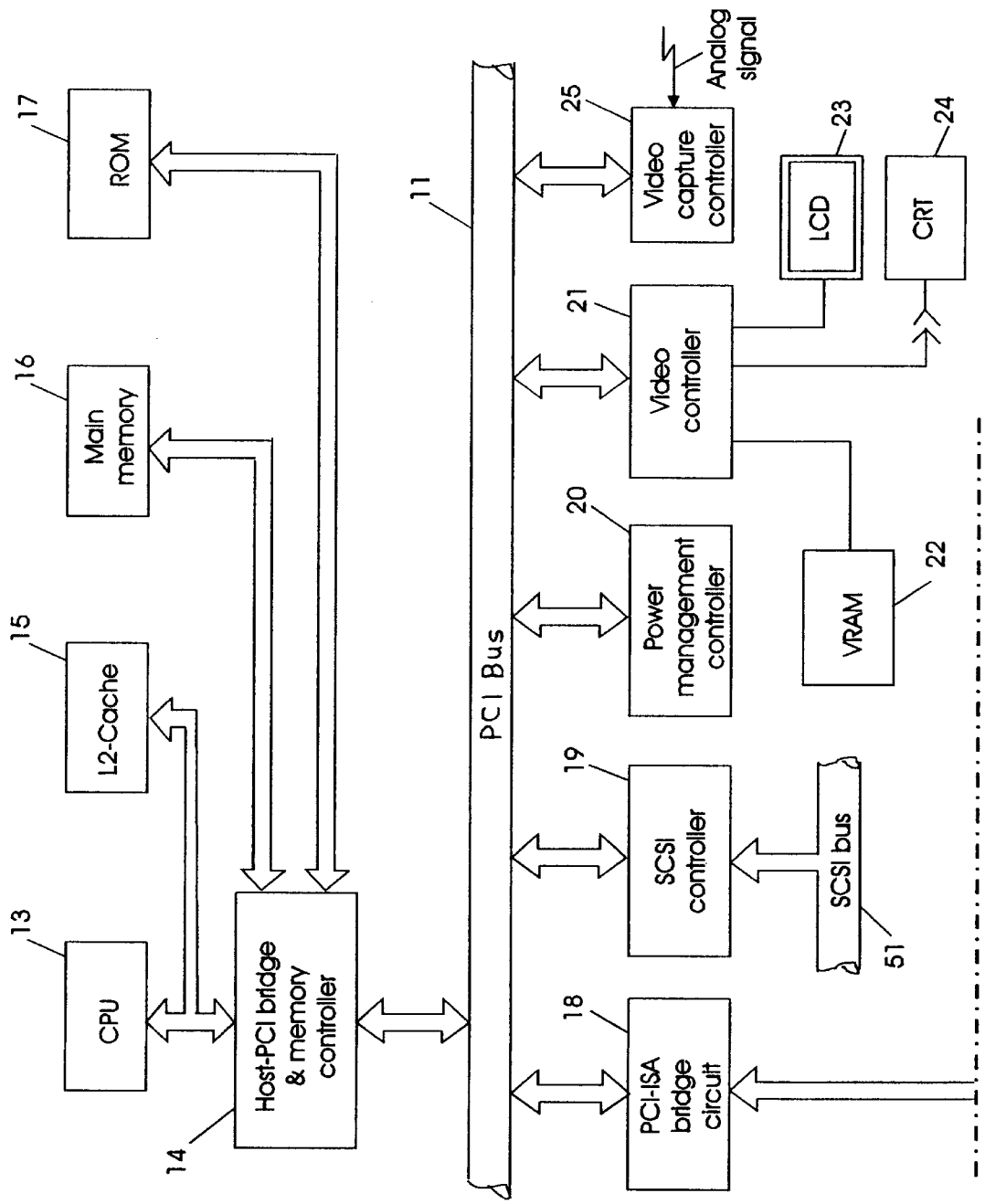

FIG. 2 is a schematic block diagram illustrating the essential hardware components of the portable computer (hereafter referred to simply as the "system") 10 according to the embodiment of the present invention.

The portable computer 10 has two layer buses, a PCI bus 11 and an ISA bus 12, to connect a CPU 13 to individual input/output devices. PCI stands for Peripheral Computer Interconnect and ISA means Industry Standard Architecture, both of which are standards for ordinary I/O interfaces. In this embodiment, the PCI 11 and the ISA 12 will be called "I/O buses" for convenience sake.

The CPU 13 that controls all the processing of the system 10 is connected via a host-PCI bridge circuit 14 to the PCI bus 11. The host-PCI bridge circuit 14 in this embodiment is a chip that consists of a paired bus bridge and memory controller, and is also connected to an L2-cache 15, a main memory 16, and a ROM 17. The L2-cache 15 (Level 2-cache 15), which is disposed outside the CPU 13, has an internal cache controller, and is provided to absorb a difference between the operation speed of the CPU 13 and the access speed for the main memory 16. The main memory 16, which is usually writable memory, such as DRAM, is employed to load a BIOS (Basic Input/Output System), a driver, an operating system (OS), and various application programs, and to temporarily store work data for jobs that are being processed by the CPU 13. The ROM 17, which is a read only memory to which specific data are written during the manufacturing process, is mainly employed to store a variety of firmware, such as a POST (Power On Self Test) for a boot process and a BIOS.

Additionally connected to the PCI bus 11 are PCI devices that support the PCI interface, such as a SCSI controller 19, a power management controller 20, a video controller 21, and a video capture controller 25.

The SCSI controller 19, which is composed of a SCSI control LSI chip, serves as an intermediate medium between the host and the SCSI devices. That is, the SCSI controller 19 receives host commands via the I/O buses 11 and 12 and issues SCSI commands to the individual SCSI devices, while it also transmits messages from the SCSI devices to the host. A hard disk 54 and a CD-ROM 55, as internal SCSI devices, are connected to a SCSI bus 51, and SCSI devices 57M through 57N are externally connected via a port connector (not shown). The details will be given in section C while referring to FIG. 3.

The power management controller 20 is a peripheral LSI that supports the CPU 13 when the system 10 executes the power management operation. In response to the job processing state, the system 10 step by step cuts off the power supply to the individual devices in the system 10. For example, in a "standby mode" the part of the circuitry including a liquid crystal display is powered down. In a "suspend mode", almost all the circuits, except for the main memory, is powered down. Upon the reception of a power management request that is issued by the CPU 13, the power management controller 20 executes the step-by-step power-down operation for the individual devices.

The video controller 21 is a peripheral LSI (e.g., VGA (Video Graphic Array)) that has a display device display image data following the contents written into a VRAM 22. The system 10 has a liquid crystal display (LCD) 23 as the standard display device and can employ a CRT display 24 via a CRT port connector (not shown).

The video capture controller 25 is a controller LSI that permits the display device 23 or 24 to superimpose image data composed by analog signal which is received from an external device (e.g., a video camera or a video reproduction device), on a displayed screen provided by application programs. As this process is not directly related to the subject of the present invention, a detailed explanation of it will not be given.

The PCI bus 11 and the ISA bus 12 communicate with each other via a PCI-ISA bridge circuit 18. The PCI-ISA bridge circuit 18 is an LSI that absorbs the difference in the data transfer speeds to enable the exchange of data between the I/O buses 11 and 12, and that includes an address buffer and a data buffer. The PCI-ISA bridge circuit 18 in this embodiment is designed as a single chip on which are packaged an interrupt controller which processes interrupt requests transmitted via the I/O buses 11 and 12, a DMA controller which transfers data directly between the main memory 16 and the input/output devices, and an internal timer.

Connected to the ISA bus 12 are ISA devices that support the ISA interface, such as an I/O controller 26, an extended I/O controller 31, an audio controller 40, and a PCMCIA controller 43.

The I/O controller 26 is a peripheral LSI that controls the timing for the transfer of data between the ISA bus 12 and various I/O devices, which are connected via a serial port 27 or a parallel port 28, or a floppy disk drive (FDD) 30. Generally, a device that transfers data by single bits, such as a modem, is connected to the serial port 27, while a device that transfers data by single bytes, such as a printer, is connected to the parallel port 28. The FDD 30 is connected to the I/O controller 26 via a floppy disk controller (FDC) 29 that controls the operation of the FDD 30.

The extended I/O controller 31 is a peripheral LSI through which a pointing device 32, an RTC/CMOS (Real Time Clock/CMOS) 33, an EEPROM (Electrically Erasable PROM) 34, and a power controller 35 communicate with the ISA bus 12. The pointing device 32, such as a mouse, a joy stick, or a track ball, is a device by which a user enters coordinates. The CMOS is provided to temporarily store system configuration information, etc. The CMOS in this embodiment is packaged with the RTC on a single chip 33, and is backed up by a coin battery (not shown) even when the system is powered off. The EEPROM 34, which is a re-writable nonvolatile semiconductor memory, is employed to store information that is required for maintaining the secrecy of the system 10 like a password, a serial number of an introduced PC card, and data for partial system configuration. The power controller 35 is a controller LSI that instructs the powering off of the entire system 10 (as compared with the power management controller 20 that performs the step-by-step powering off of the devices). The power controller 35 is connected to a keyboard 36, a power switch 37, a battery pack 38, and an LED 39. The power controller 35 forces the power switch 37 off to halt the power supply to the whole system 10. Further, the power controller 35 monitors a matrix input from the keyboard 36 and the voltage level (or remaining capacity) of the battery pack 38 to detect a predetermined condition, halts the power supply to the whole system 10, and displays the current power supply state on the LED 39.

The audio controller 40 is a peripheral LSI that processes the input/output of an audio signal. In FIG. 2, an audio signal is output via an amplifier 41 from a loudspeaker 42.

The PCMCIA controller 43 is an interface controller that enables data exchange between a PCMCIA card and the ISA bus 12. One or more slots 44 are disposed on the side of the system 10 body to load PCMCIA cards. PCMCIA, which means Personal Computer Memory Card Interface Association, is the standard for connecting PC cards, such as memory cards and modem cards, by using part of the signals on the ISA bus.

Connection of the SCSI Devices to the System

FIG. 3 is a schematic block diagram illustrating SCSI devices installed inside and outside of the portable computer 10 according to the embodiment of the present invention.

Figure 10:
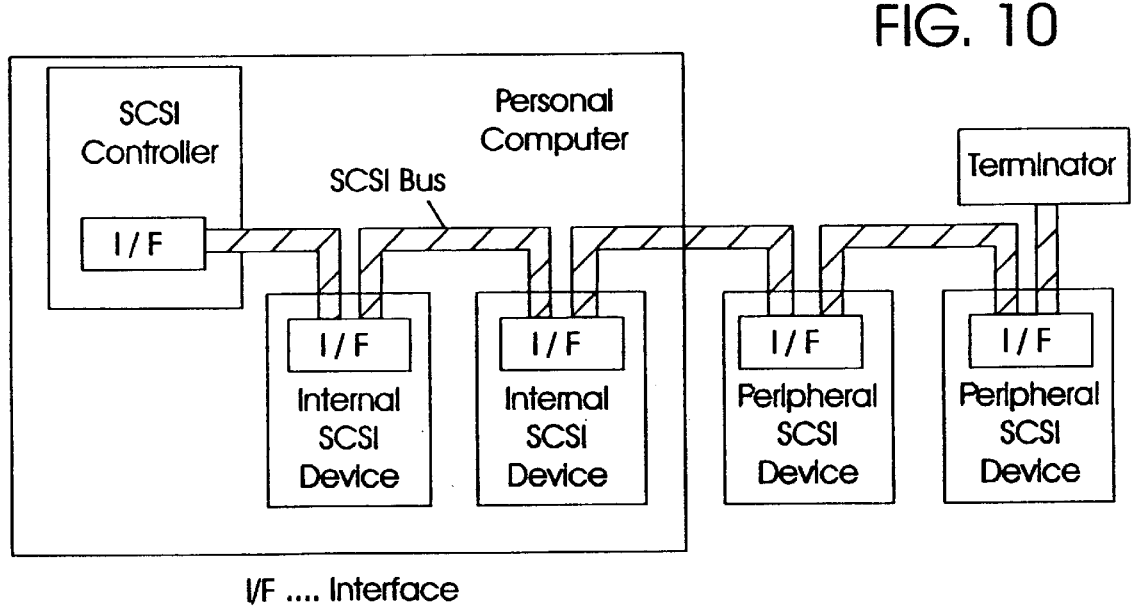
FIG. 10 is a diagram illustrating the connection of SCSI devices to a computer system, or more specifically, a daisy chain connection of the interfaces of the SCSI devices via SCSI buses.

Internal SCSI device C is a SCSI controller 19 that communicates with the I/O buses 11 and 12 for the exchange of commands with the system 10. The SCSI controller 19 is connected via the SCSI bus 51 to the hard disk 54 which corresponds to internal SCSI device A, and the CD-ROM 55, which corresponds to internal SCSI device B, and external SCSI device 57M through external SCSI device 57N. These SCSI devices are physically connected in the form of a daisy chain, as is shown in FIG. 10.

A particular aspect of the system 10 according to the embodiment of the present invention, is the inclusion in the system 10 of a SCSI_ID control register 53 and a SCSI device detecting register 52, in addition to the above described conventional components.

The system 10 writes into the SCSI_ID control register 53 commands or data that are to be transmitted to the internal SCSI devices 19, 54, and 55; and the internal SCSI devices 19, 54, and 55 write into the SCSI_ID control register 53 data that are to be transmitted to the system 10. The SCSI_ID control register 53 is coupled with the system 10 via the I/O buses 11 and 12, and is connected to the internal SCSI devices 19, 54, and 55 via signal lines 58, 59, and 60, respectively. A command that the system 10 should send is a request for the internal SCSI devices to write and read their ID numbers, and data that are exchanged between the system 10 and the internal SCSI devices 19, 54, and 55 are ID numbers. The internal SCSI device 19, 54, or 55 that receives a command requesting to write an ID number via the SCSI_ID control register 53 updates its own ID number to correspond to a value that is read from the register 53. The internal SCSI device 19, 54, or 55 that receives a command requesting to read an ID number via the SCSI_ID control register 53 writes its own ID number into the register 53, so that the system 10 can acquire the requested internal SCSI device ID number by referring to the register 53. More specifically, in this embodiment, as the SCSI_ID control register 53 is provided as a dedicated interface in addition to the SCSI interface, the writing and the reading of the ID numbers of the respective internal SCSI devices 19, 54, and 55 (i.e., "ID control") is possible at any time.

The SCSI device detecting register 52, which is coupled with the system 10 via the I/O buses 11 and 12, receives one GND line (more specifically, signal #21) that is included in the SCSI bus 51, and constantly updates the low/high level of the signal #21. The GND line in the SCSI bus 51 is usually grounded by the external SCSI device. While at least one external SCSI device is connected to the SCSI bus 51, the signal #21 level becomes ACTIVE_LOW. Therefore, the system 10 sends a read command to the SCSI device detecting device 52 and reads the level of the signal #21, so that the presence of the external SCSI device can be detected (the numbers of the connected external devices is not known by the SCSI device detecting register 52).

The system 10 that executes a POST program, configuration software, or PMC substantially processes the requests for reading and writing of the ID numbers of the internal SCSI devices (see section E). In this embodiment, the SCSI_ID control register 53 and the SCSI device detecting register 52 are packaged together in the same LSI chip of the extended 1/0 controller 31 (see FIG. 2) for convenience of design.

Software Arrangement of the System

Figure 4:
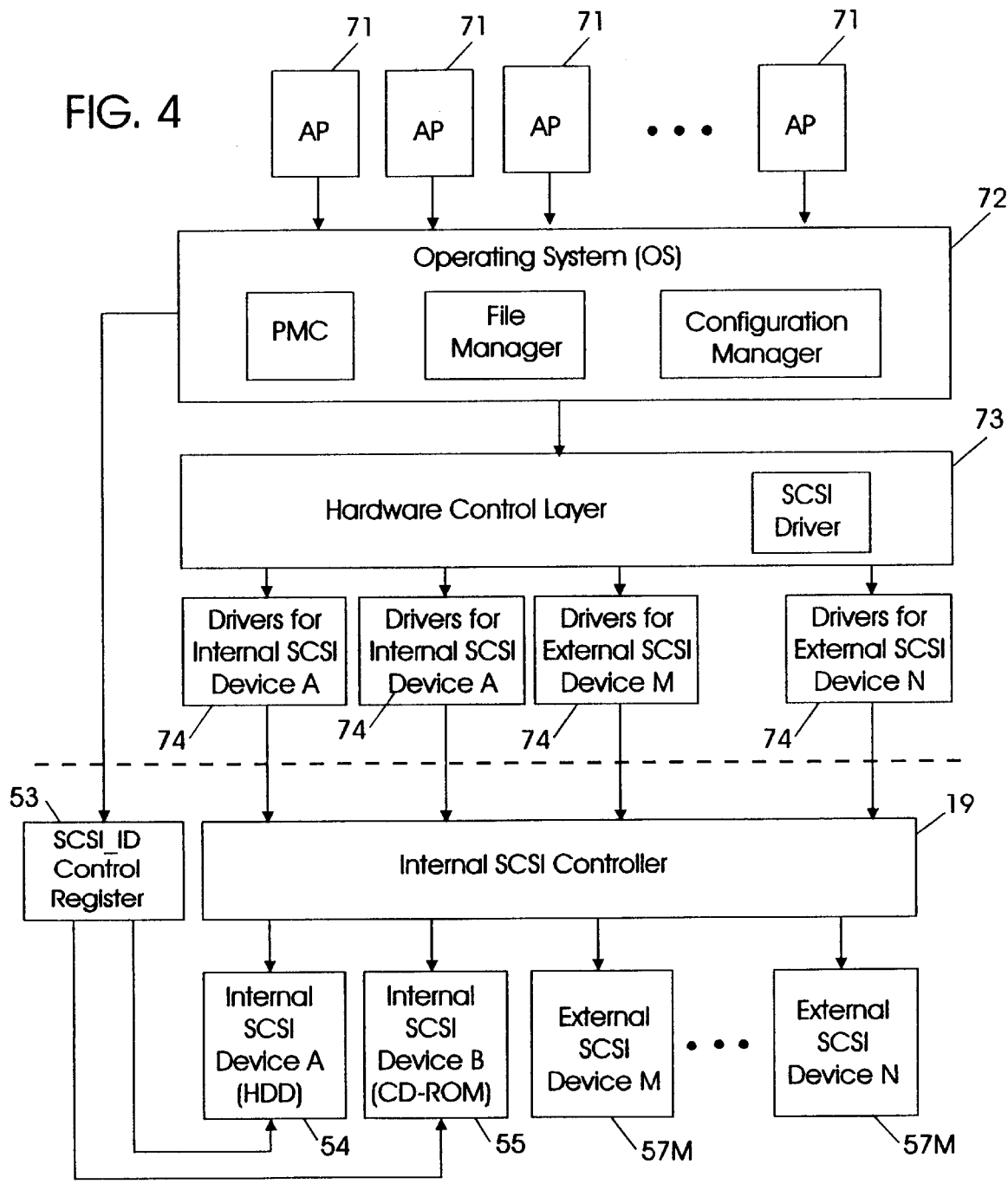
FIG. 4 is a schematic diagram illustrating how the various layers of software and the hardware that are loaded in a system interface according to the embodiment of the present invention.

FIG. 4 is a conceptual diagram illustrating the hierarchical of software layer that is loaded into the system 10 according to the embodiment of the present invention, and of the interface between the software and hardware.

The software hierarchy is arranged in the descending order shown for the application programs (AP) 71, an operating system (OS) 72, a hardware control layer 73, and individual SCSI device drivers 74.

The OS 72, which is software for controlling the operation of the AP 71, etc, provides services, such as the management of the hardware resources, scheduling, and input/output control. The OS 72 in this embodiment has a "PMC" for executing the power management operations (including hibernation) of the system 10, a "file manager" for administrating file system devices, a "configuration manager" as a client that requests to install the system configuration, and "configuration software" as a server that actually installs of the system configuration.

The hardware control layer 73 is designed with micro codes by which the OS 72 can exchange data and commands with the individual devices, and controls the hardware operations of the devices. HAL (Hardware Abstraction Layer) of Windows_NT (a trademark of Microsoft Inc.) and MICROKERNEL of OS/2 (a trademark of US IBM Inc.) correspond to the hardware control layer. The hardware control layer 73 includes a SCSI driver 73'. The SCSI driver 73' is a file wherein are stored codes that are employed to translate general commands originating at the APs 71 and the OS 72 to specific SCSI commands and to transfer the resultant commands to the SCSI controller 19.

The SCSI device drivers 74 are files in which are stored codes that are inherent to the individual SCSI devices 54 and that are not supported in the SCSI driver 73'. Since the SCSI devices have their inherent hardware design, SCSI device drivers 74 that correspond to the respective SCSI devices are necessary. Therefore, if the correct device drivers are not installed, the OS 72 cannot acknowledge the presence of the corresponding devices. It should be noted that there are some SCSI devices that require only the SCSI driver 73' in order to handle commands from the OS 72. In this case, the installation of the SCSI device drivers 74 is not necessary.

In general, the commands that are issued by the APs 71 and the OS 72 are translated by the SCSI driver 73 and the corresponding SCSI device drivers 74 (as needed), and the translated commands are transmitted to the internal SCSI controller 19 in the hardware layer. The SCSI controller 19 issues the received commands as SCSI commands and distributes them to the target SCSI devices via the SCSI bus 51. It should be noted that there is software in the OS 72 that can bypass the SCSI driver 73 and the SCSI device drivers 74 and contact the hardware layer directly. For example, the POST, the PMC, and the configuration software can contact the SCSI_ID control register 53 in the hardware layer directly, and write, into the SCSI_ID control register 53, commands or data that request reading or writing of the ID numbers of the internal SCSI devices, or read the data from the register 53 (previously described). Reading and writing of the ID numbers from and to the SCSI_ID control register 53 doesn't conform to the protocol of the SCSI, and the system 10 can perform that operation as needed.

System Operation

Since the hardware configuration of the system 10 according to the embodiment of the present invention has been described in section A through D, the operation of the system 10 and the processing of the present invention will be now explained in this section. The system 10 performs the writing of ID numbers to the internal SCSI devices when the system 10 is booted and when a user detaches optional external SCSI device and replaces by another one (dynamic configuration). The reading of the ID number from the internal SCSI device is required when a hibernation target file is to be designated.

(1) Boot process

Figure 5:
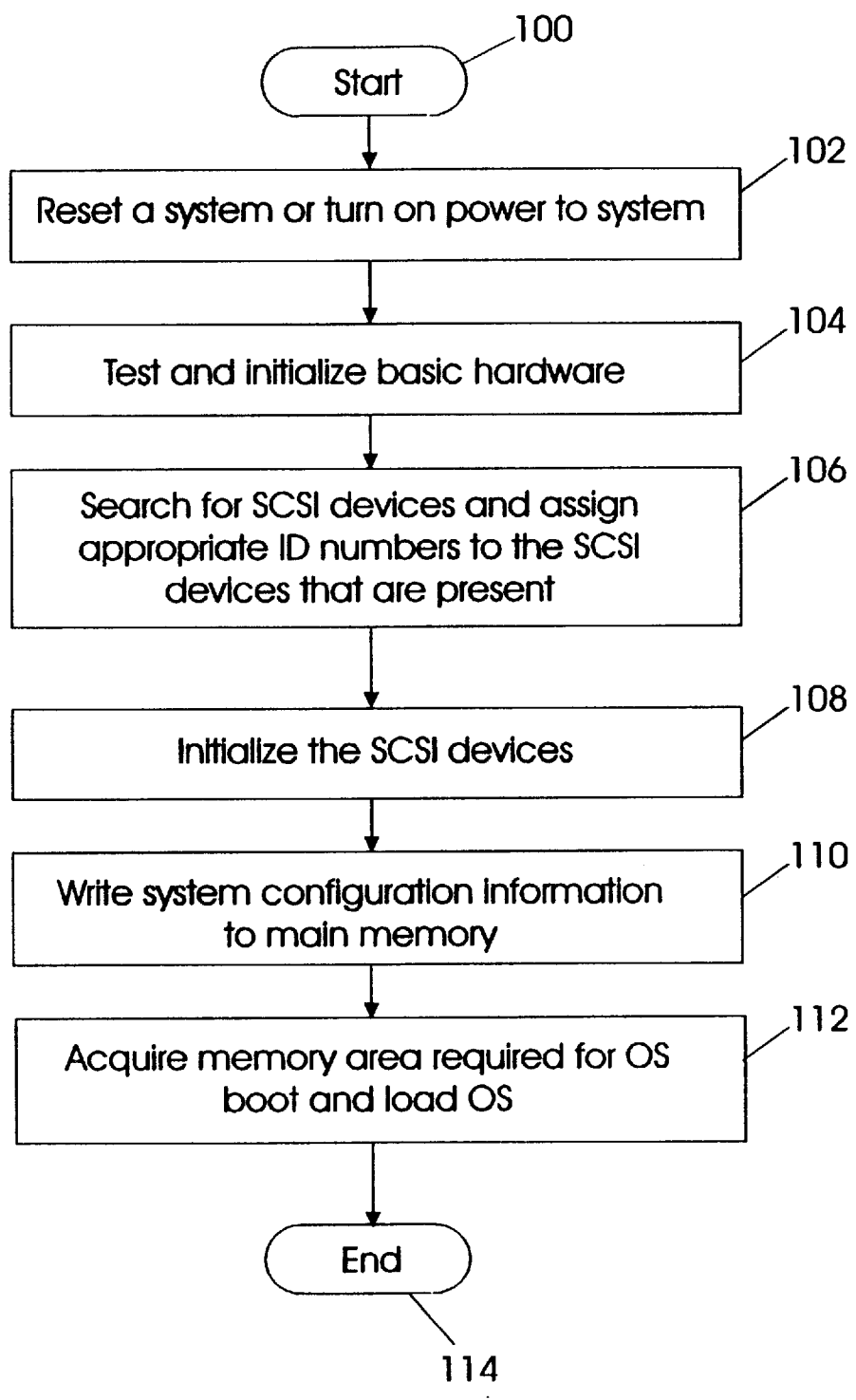
FIG. 5 is a flowchart showing a boot process for a system.

FIG. 5 is a flowchart showing the boot process performed by the system 10. The boot process is usually performed following the POST.

When the system 10 is powered on by the depression of the power switch 37, or when the system test is triggered (step 102), testing and initialization of the basic hardware is performed (step 104). In more detail, a check of the CPU 13, the setup of the main memory 16, and the initialization of the PCI devices (including the interrupt controller, the DMA controller, and the timer) are performed.

Then, a check is performed to determine whether or not SCSI devices are present, and if they are present, ID numbers are properly assigned to the individual SCSI devices (step 106). This step 106 is an essential elements for the present invention, and detailed explanation of them will be given in section (2).

The SCSI devices are initialized at step 108. More specifically, during this step 108, the SCSI devices are examined to determine whether or not they are electrically and mechanically damaged, and various parameters (the rotation speed of a spindle motor and the data transfer speed if the device type is disk drive) are set.

System configuration information is written in a defined area in the main memory 16 at step 110. A general example of the system configuration information includes information on the CPU 13, the type of cache 14, the size of the main memory 16, a TLB (Translation Lookaside Buffer), the number of SCSI devices and their ID numbers and device types, and the attributes of the firmware in the ROM 17. Such system configuration information is usable by the OS 72 when it is written into the defined area of the main memory 16.

At step 112, an area (e.g., several tens of MB) required for OS booting is acquired in the main memory 16, and the OS 72 is loaded by a predetermined file type device. The boot process is thereafter terminated (step 114). When there are two or more file type devices present along the SCSI bus 51 which store the OS, priority is given to CD-ROM rather than to HDD, to the device to which the highest ID number has been assigned.

When a file manager of the OS 72 receives data concerning the SCSI devices, such as the ID numbers and the device types, the file manager assigns logical numbers, or drive letters, to the respective SCSI devices. In Table 1 are depicted example assignments. As shown in Table 1, logical number "12h" and drive letter "D:" are assigned to the internal SCSI hard disk 54; "14h" and "F:" are assigned to the internal SCSI_CD-ROM 55; "13E" and "E:" are assigned to the external SCSI device 57M; and "10h" and "C:" are assigned to the external SCSI device 57N. Since the SCSI controller 19 is not a file type, neither a logic number nor a drive letter are entered (NA: Not Available). The number "7," which represents the highest priority, is generally the ID number that is assigned to the internal SCSI controller 19, so as to permit the SCSI controller to fully function as an "initiator" (the premise in the following explanation is that the number "7," or one of the numbers "1" through "6," is predetermined to be the ID number for the internal SCSI controller 19). Although the entries in the lowest row in Table 1 are employed to search for a hibernation target (which will be described later), no explanation for them will be given here.

[Table 1]

(2) Assignment of ID numbers to the internal SCSI devices

Figure 6:
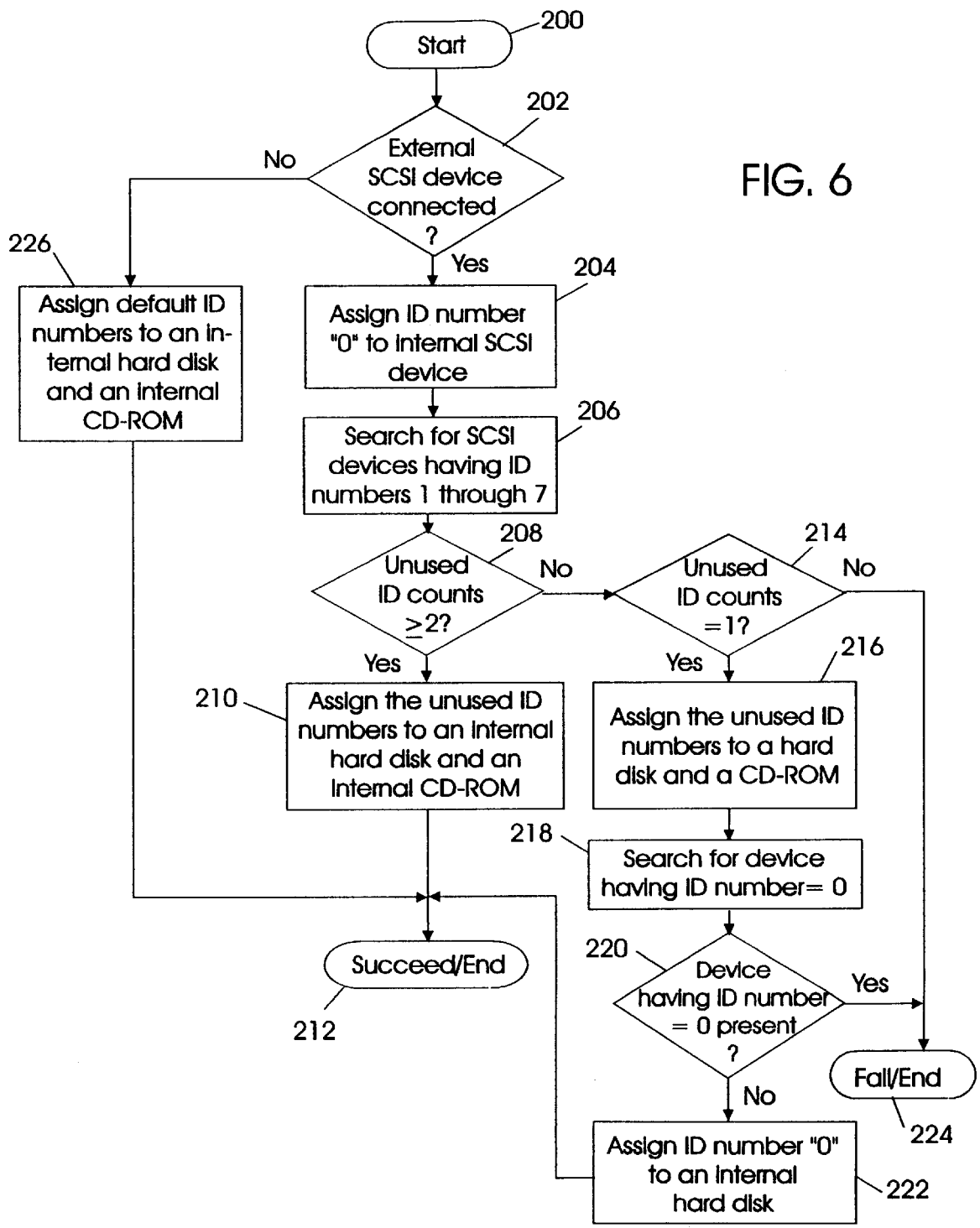
FIG. 6 is a partial flowchart showing the steps that are executed by a POST program or by configuration software, and more specifically, showing the processing for the confirmation of the presence of SCSI devices and for the proper arrangement of ID numbers to the individual SCSI devices.

FIG. 6 is a flowchart showing the detailed steps, for the assignment of ID numbers to the SCSI devices 54 and 55, that is performed within the above described step 106.

The installation of an external SCSI devices is usually optionally performed by a user. First, at step 202, a check is performed to determine whether or not the external SCSI device is connected to the SCSI bus 51. For that determination, the SCSI device detecting register 52 monitors the GND pin (#21) in the SCSI bus 51, as has been previously described. When the GND pin #21 indicates ACTIVE_LOW, it represents that at least one SCSI device is connected externally.

When the detection result at step 202 is negative, default ID numbers are assigned to the internal hard disk 54 and the internal CD-ROM 55 (step 226). The process is thereafter successfully terminated (step 212). Although the ID number of the external SCSI device can be arbitrarily set by user's intention, if there is no external SCSI device present, the ID numbers for the internal SCSI devices are not affected by external SCSI device any more. The assignment of the ID numbers to the internal SCSI devices 54 and 55 is performed by writing ID writing request commands and ID numbers into the SCSI_ID control register 53 (see section C). Since the SCSI_ID control register 53 is a dedicated interface that do not conform to the SCSI, the system 10 can perform the writing of ID numbers as needed.

When the result at step 202 is affirmative, ID number "0" is temporarily assigned to both the internal SCSI devices (step 204). The assignment of temporary ID number "0" is based on the premise that an external SCSI device is installed only when a user thinks it is necessary and that therefore the ID number "0" having the lowest priority should not be assigned to the external SCSI devices. As has been previously described, ID numbers for the internal SCSI devices 54 and 55 are assigned via the SCSI_ID control register 53.

Then, ID numbers that are already in use are searched for at step 206. The search is performed by the presence detection of ID numbers in an ascending order from 1 through 7 with the help of Table 1, for example. Subsequently, as the result of the search at step 206, a check is performed at step 208 to determine whether or not there are two or more unused ID numbers present among the numbers 1 through 7.

If the result at step 208 is affirmative, two of the unused ID numbers are assigned to the internal SCSI devices 54 and 55, respectively (step 210). The process is thereafter successfully terminated (step 212). Through this process, ID numbers having higher priority than "0" are preferably assigned to the internal SCSI devices 54 and 55. As has been previously described, the assignment of the ID numbers to the internal SCSI devices 54 and 55 is performed via the SCSI_ID control register 53.

If the result at step 208 is negative, a check is performed at step 214 to determine whether or not there is just one unused ID number among the numbers 1 through 7.

A negative result at step 214 occurs when six external SCSI devices are installed. However, less than six external SCSI devices are allowed to be installed on the system 10 (see section A). Therefore, the negative result at step 214 in this case means that an incorrect hardware setup has been performed by a user, and the process is terminated in failure (step 224). In this case, an error message may be displayed on the display device 23 to notify a user to correct the hardware setup.

An affirmative result at step 214 may occur either when the maximum five external SCSI devices are installed and two ID numbers, including "0," are unused, or when the ID number "0" is assigned to one external SCSI device so that six SCSI devices are installed. When the result at step 214 is affirmative, first, unused ID numbers found at step 208 are assigned to both the internal SCSI devices 54 and 55 (step 216) (it should be noted that the assignment of the ID numbers to the internal SCSI devices is performed via the SCSI_ID control register 53, as has been previously described). Then, at steps 218 and 220, presence detection is performed to determine which SCSI device has the ID number "0."

If the result at step 220 is affirmative, that is, the external SCSI device of the ID number "0" exists, this represents that there are six externally installed SCSI devices, and, as well as for the negative result at step 214, means that an incorrect hardware setup has been performed by a user. The process is terminated in failure (step 224).

If the result at step 220 is negative, this means that two ID numbers, including "0," are unused, and ID number "0" is reassigned to the internal SCSI hard disk 54 (step 222). The process is thereafter terminated successfully (step 212). The assignment of the ID number is performed via the SCSI_ID control register 53. The ID number "0," which has a low priority, is assigned to the internal hard disk 54 simply because this is the custom that has been followed for recent computer systems.

By following the above described process, however, the system 10 can properly assign ID numbers to the individual SCSI devices so that the ID numbers of the internal SCSI devices do not collide with those of the external SCSI devices. This process is supposed to be executed by a routine that is included in the POST program (it should be noted that, in section (3) and at step 304 in FIG. 7, the same operation is performed by configuration software that is requested by the configuration manager (to be described later)).

(3) Processing of dynamic configuration

Figures 7, 11:
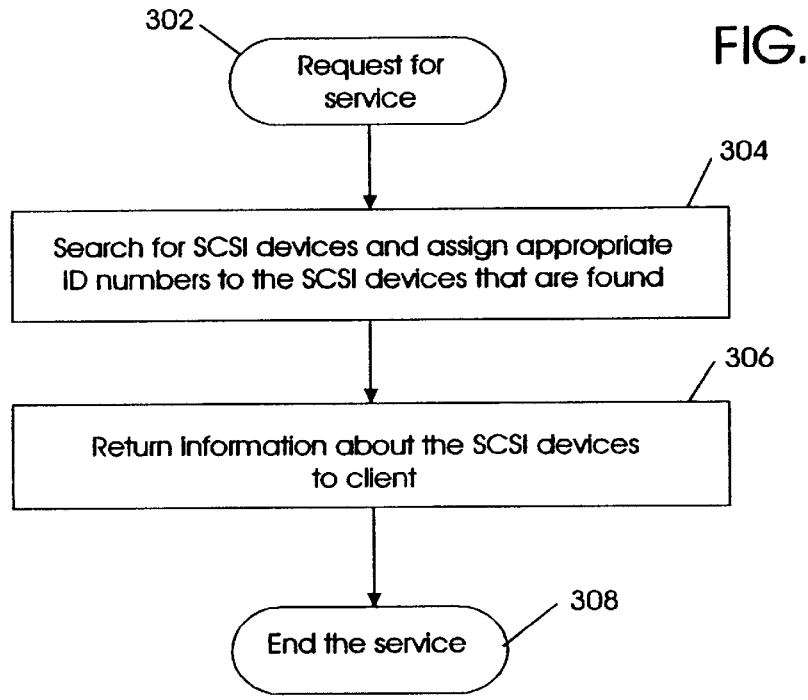
FIG. 7 is a flowchart showing the processing for dynamic configuration.
FIG. 11 is an example of ID numbers that are read for internal SCSI devices.

FIG. 7 shows the processing for updating ID numbers of the SCSI devices while the system 10 is being operated, i.e., the dynamic configuration. Dynamic configuration is performed when a user detaches and at least one SCSI device after the system 10 has been activated and replaces with another ones.

A user first physically attaches a desired SCSI device, and then calls a configuration manager by clicking a corresponding software icon on a display screen. The configuration manager, which is only a client, then requests the configuration software, which is a server, to service the request for dynamic configuration (step 302). The configuration software is a program that can configure the system and that can prepare the related system configuration information, and is positioned beneath the configuration manager in the OS 72. In general, configuration software exist along with the respective interface standard. At step 302, the configuration manager for the SCSI interface receives a service request.

The configuration software that has received the service request performs a search to determine the presence of SCSI devices, and then properly assigns ID numbers to the SCSI devices (step 304). Since the detailed operation at step 304 is the same as that described in section (2) and in FIG. 6, the detailed explanation for it will not be given here.

Then, the configuration software returns information about the SCSI devices, such as their ID numbers and device types, to the configuration manager as a client (step 306). The process for a service request is thereafter terminated (step 308).

According to the above description, it would be understood by one having ordinary skill in the art that the assignment of ID numbers is performed so that the ID numbers of the internal SCSI devices do not collide with those of the external SCSI devices. The acquired system configuration information is written into a defined area in the main memory 16 and can thus be used by the OS 72.

(4) Hibernation processing

Figure 8:
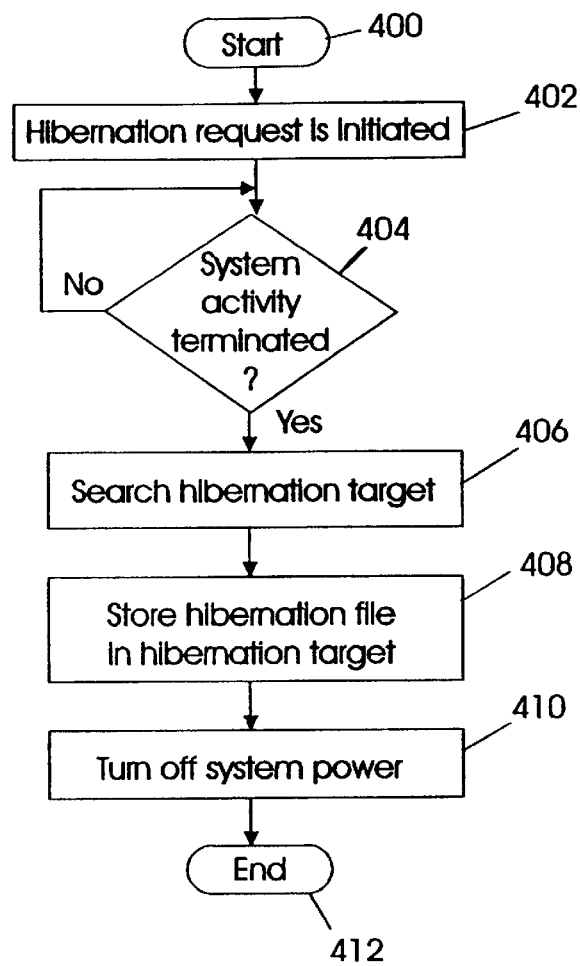
FIG. 8 is a flowchart showing the processing for shifting the system to a hibernation mode.

FIG. 8 shows the processing that is performed when the system 10 enters into a hibernation mode. The transition to the hibernation mode is executed by the PMC in the OS 72. The definition of "hibernation" has previously been given in "Description of the Background Art."

When a predetermined hibernation request occurs in the system 10, the administrative right for the operation of the system 10 moves to the PMC (step 402). A hibernation request is issued, for example, when a hot key is depressed, or when the voltage output by the system 10 battery drops to a low level.

The PMC first examines the system activity (step 404). When activity is detected (for example, when DMA is being performed), the PMC repeats the activity check following the lapse of a predetermined period of time (e.g., 10 msec), and continues thus until no system activity is detected.

When no system activity is detected, the PMC searches, among the SCSI devices connected to the SCSI bus 51, for a drive that can serve as a hibernation target to save a hibernation file (step 406). This step is the essential element of the present invention and will be described in detail in section (5).

The PMC then saves the hibernation file to the hibernation target (step 408).

Following this, the PMC sends a request to the power controller 35 to power off the whole circuitry of the system 10 (step 410). The system 10 is thus shifted to the hibernation mode and the process is thereafter terminated (step 412).

Since the wake up from the hibernation mode can be provided by following conventional procedures, no explanation for it will be given.

(5) Processing for the search for a hibernation target

Figure 9:
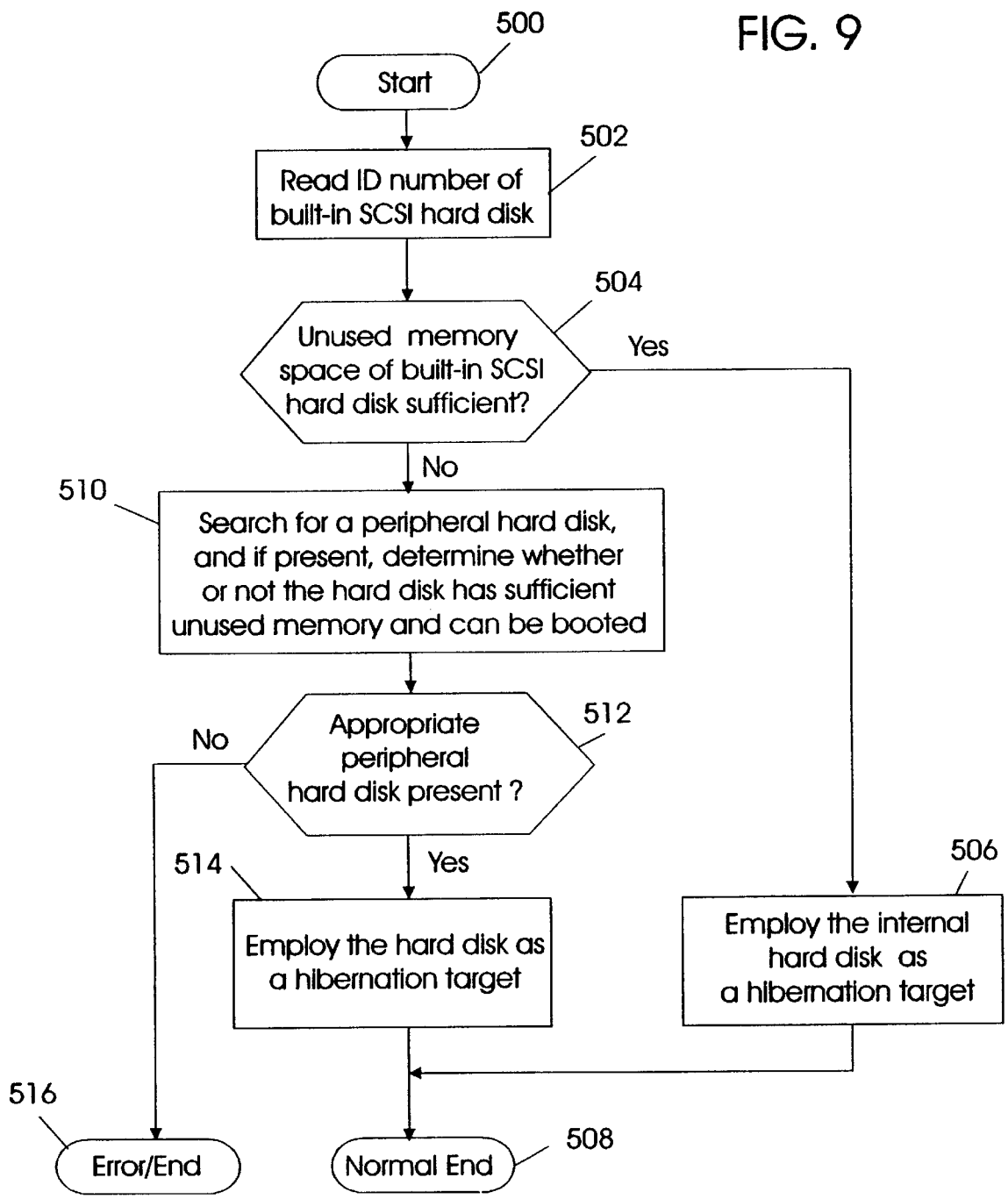
FIG. 9 is a flowchart showing the detailed processing for searching for a hibernation target.

FIG. 9 is a flowchart showing the detailed processing, which is performed during a search for a hibernation target within step 406 that has been described above.

The PMC reads the ID numbers of the internal SCSI devices 54, 55 and 19 and specifies the ID number for the internal SCSI hard disk 54 (step 502). As has been previously described, the ID numbers of the internal SCSI devices are read by writing an ID read request to the SCSI_ID control register 53. Since the SCSI_ID control register 53 is a dedicated interface that does not conform to the SCSI protocol, the system 10 can read the ID numbers as desired.

Using Table 1 (FIG. 11) as an example, the ID numbers that are read for the internal SCSI devices A, B, and C are "2," "3," and "7." The file manager of the OS 72 can know, according to the protocol of the SCSI, that the types of the respective SCSI devices of which ID numbers are "2," "3," and "7" are the hard disk, the CD-ROM, and the SCSI controller. The PMC can therefore assume that the SCSI devices that have ID numbers other than "2", "3", and "7" are external devices and cannot be used as hibernation targets (NA: No Available), that the SCSI device with ID number "7" is not a file and is not available (NA) as a hibernation target, that the SCSI device with ID number "3" is a read only file and is not available (NA) as a hibernation target, and that the SCSI device with ID number "2" is a hard disk and is therefore available (A) as a hibernation target.

Next, at step 504, a check is performed via a file manager to determine whether or not the internal hard disk 54 that is specified at step 502 has sufficient unused memory space to accept a hibernation file. When the internal hard disk 54 has sufficient unused memory, the hibernation file is saved to the hard disk 54 (step 506). The process is thereafter terminated successfully.

When the result at step 502 is negative, the PMC must perform an exceptional process. In this exceptional process example, an external SCSI hard disk is employed as a hibernation target. First, a check is performed to determine whether or not at least one SCSI hard disk is present externally. If one is present, a check is performed to determine whether or not this external hard disk has sufficient unused memory space and whether or not booting from the hard disk is possible (step 510). When it is found that a proper external SCSI hard disk is present (branch Yes at step 512), that hard disk is employed as a hibernation target (step 514). The process is thereafter terminated successfully (step 508). When a proper external hard disk is not found (branch No at step 512), the process is terminated in failure (step 516). In this case, an error message may be displayed on the display device 23 to notify a user to correct the hardware setup.

The present invention has been explained in detail while referring to the specific embodiment. It is, however, obvious to one having ordinary skill in the art that it is possible to vary or to modify the embodiment without exceeding the scope of the present invention. In other words, the present invention is disclosed as the preferred mode, and should not be limited to the above described embodiment. To understand the subject of the present invention, the claims of the present invention should be referred to.

The "internal SCSI device" in this specification is not necessarily limited to a physical SCSI device that is internally provided in the computer system, but includes devices that are conceptionally supposed to be inside the computer. For example, though not internally provided inside the computer, an external SCSI device that is removed less frequently than the other ones that are connected to the same location in relation to the computer may substantially be the "internal SCSI device" described in this specification.

As described above in detail, according to the present invention it is possible to provide a data processing apparatus that has internal SCSI devices, to include a SCSI controller, that can have external SCSI devices that are attached via a port connector, and that can manage the ID numbers (identification numbers) of the internal SCSI devices without requiring data to be input by a user; and to provide a method for controlling such a data processing apparatus.

More specifically, according to the present invention, ID numbers can be written into internal SCSI devices. ID numbers that do not collide with the ID numbers of SCSI devices that are externally connected are selected for the internal SCSI devices. Further, the system can automatically write the ID numbers during the boot process or when the system configuration is physically changed.

In addition, according to the present invention the system can read the ID numbers of the internal SCSI devices. Even when there are SCSI hard disk drives installed both inside and outside of the system, as the ID numbers of the internal SCSI hard disk drives can be read, those SCSI hard disk drives that are positioned internally can be identified. Therefore, when a system enters into a hibernation mode because the power output by a battery falls low, one of the internal SCSI hard disks can be designated as the destination to which a hibernation file is saved, and the resumption of the job execution at the following wake up is thereby ensured.

We claim:

1. In a computer system wherein both internal and external peripheral devices can be connected to a bus, wherein each of the peripheral devices can be assigned one of "M" identification codes (ID's), and wherein there are "I" internal peripheral devices ("I" and "M" being integer numbers wherein "I" is less than "M"), a method for setting unique ID's for the internal peripheral devices that are not in conflict with the ID's for the external peripheral devices, the method comprising the steps of:

a) setting the ID for each of the "I" internal peripheral devices equal to a first ID;

b) polling the peripheral devices to find, count and record ID's that are not equal to the first ID;

c) if "M" minus the count (as determined in step "b") is equal to or greater than "I", then setting the ID for each of the internal peripheral devices equal to a unique one of the ID's not found in step "b";

d) if "M" minus the count (as determined in step "b") is equal to "I" minus 1, then setting the ID for each of the "I" internal peripheral devices equal to a second ID, the second ID being one of the ID's not found in step "b";

e) polling the peripheral devices to find an ID equal to the first ID;

f) if, in step "e", an ID has been found that equals the first ID, then issuing an error message; and g) if, in step "e", an ID has not been found that equals the first ID, then setting the ID for each of the "I" internal peripheral devices equal to a unique one of a set of ID's, the set of ID's including the first ID plus the ID's not found in step "b".

2. A computer system wherein both internal and external peripheral devices can be connected to a bus, wherein each of the peripheral devices can be assigned one of "M" identification codes (ID's), and wherein there are "I" internal peripheral devices ("I" and "M" being integer numbers wherein "I" is less than "M"), the computer system for setting unique ID's for the internal peripheral devices that are not in conflict with the ID's for the external peripheral devices, the computer system comprising:

first means for setting the ID for each of the "I" internal peripheral devices equal to a first ID;

second means for polling the peripheral devices to find, count and record ID's that are not equal to the first ID;

third means for determining if "M" minus the count (as determined by the second means) is equal to or greater than "I", and for setting the ID for each of the internal peripheral devices equal to a unique one of the ID's not found by the second means;

fourth means for determining if "M" minus the count (as determined by the second means) is equal to "I" minus 1, and for setting the ID for each of the "I" internal peripheral devices equal to a second ID, the second ID being one of the ID's not found by the second means;

fifth means for polling the peripheral devices to find an ID equal to the first ID;

sixth means for determining if an ID has been found by the fifth means that equals the first ID, and for issuing an error message; and seventh means for determining if an ID has not been found by the fifth means that equals the first ID, and for setting the ID for each of the "I" internal peripheral devices equal to a unique one of a set of ID's, the set of ID's including the first ID plus the ID's not found by the second means.

* * * * *